(12) United States Patent
Footz et al.

(10) Patent No.: US 8,960,489 B2
(45) Date of Patent: Feb. 24, 2015

(54) BIODEGRADABLE AND COMPOSTABLE SINGLE-SERVE BEVERAGE INGREDIENT PACKAGE

(71) Applicant: GCup Technology Corp., Surrey (CA)

(72) Inventors: Darren Joseph Footz, Surrey (CA); Calvin S. Krupa, Greenfield, MN (US)

(73) Assignee: GCup Technology Corp., Surrey BC ( * ) Notice: Subject to any disclaimer, the term of this patent is extended or adjusted under 35 U.S.C. 154(b) by 0 days.

(21) Appl. No.: 14/186,333

(22) Filed: Feb. 21, 2014

(65) Prior Publication Data

US 2014/0332547 A1    Nov. 13, 2014

Related U.S. Application Data (60) Provisional application No. 61/821,194, filed on May 8, 2013.

(51) Int. Cl.
*A47J 31/06*    (2006.01)
*B65D 43/02*    (2006.01)

(52) U.S. Cl.
CPC ................................ *B65D 43/022* (2013.01)

USPC ........................................... 220/796; 210/464

(58) Field of Classification Search
USPC ............... 220/796, 806, 359.1; 210/464, 465, 210/466, 467, 468, 469, 473, 474; 99/295
See application file for complete search history.

(56) References Cited

U.S. PATENT DOCUMENTS

| | | | |
|---|---|---|---|
| 5,243,164 A * | 9/1993 | Erickson et al. ............... 219/689 |
| 5,325,765 A * | 7/1994 | Sylvan et al. .................. 99/295 |
| 6,607,762 B2 * | 8/2003 | Lazaris et al. ................. 426/79 |
| 6,645,537 B2 * | 11/2003 | Sweeney et al. ............... 426/79 |
| 8,573,115 B2 * | 11/2013 | Lai et al. ........................ 99/286 |
| 8,794,125 B1 * | 8/2014 | Rivera .......................... 99/295 |
| 2004/0045443 A1 * | 3/2004 | Lazaris et al. ................. 99/279 |
| 2009/0081332 A1 * | 3/2009 | Spector .......................... 426/72 |
| 2011/0185911 A1 * | 8/2011 | Rapparini ...................... 99/295 |

* cited by examiner

*Primary Examiner* — Steven A. Reynolds
*Assistant Examiner* — King M Chu (57) ABSTRACT

Single-serve ingredient packages made from materials which are biodegradable and compostable and which are derived from readily renewable resources environmentally advantageous and may be used to brew beverages such as coffee, tea and cocoa.

11 Claims, 6 Drawing Sheets

BIODEGRADABLE AND COMPOSTABLE SINGLE-SERVE BEVERAGE INGREDIENT PACKAGE

CROSS-REFERENCED TO RELATED APPLICATIONS

This application is a non-provisional application of Application No. 61/821,194, filed May 8, 2013 and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates to a single-serve beverage ingredient package of the type which may be used, for example, in a Keurig® style coffee brewing machine. More specifically, the present invention relates to a beverage package which is entirely biodegradable and compostable and made from readily renewable resources.

II. Related Art

Various types of beverage packages for providing one or more ingredients (such as coffee) are known in the art and are commercially available. The popularity of such single-serve beverage ingredient packages has grown exponentially over the past decade along with the popularity of single serve brewers such as the coffee brewers sold under the Keurig® trademark. Such beverage ingredient packages typically hold dry ingredients, such as coffee, tea, cocoa or the like, for a single beverage serving. The package is placed into a compartment of a brewing machine and then penetrated with a fluid injector and a fluid extractor. A brewing medium, such as hot water, is then injected into the package such that the dry contents of the package are at least partially dissolved by or form a mixture with the brewing medium. The solution or mixture is then extracted from the package, the result being a drinkable beverage such as coffee, tea, hot cocoa or the like.

The aforementioned beverage packages typically comprise a container, a filter, and a cover. The container and filter are typically made from petroleum-based plastic materials which are neither biodegradable nor compostable. Such materials are also not made from readily renewable resources. The cover is typically made of a metal foil or a metal foil laminate which is glued to the top of the container. Neither the metal foil of the cover nor the glue are typically biodegradable, compostable or made from readily renewable resources.

The aforementioned beverage packages give rise to significant environmental concerns. First, neither the container, the filter nor the cover is made from readily renewable resources. Second, neither the container, the filter nor the cover is easily recycled. Third, neither the container, the filter nor the cover is made from materials which are biodegradable or compostable. As such, the beverage packages typically end up in landfills contributing to the environmental concerns associated with disposal of trash.

In view of the foregoing, there is a real need for a single-serve beverage ingredient package constructed of biodegradable and compostable materials made from readily renewable resources that will achieve acceptable results when brewing coffee, tea, cocoa or the like in a single-serve brewer.

SUMMARY OF THE INVENTION

The present invention addresses the limitation of prior art single-serve beverage ingredient packages by providing a cup and a lid, each of which is biodegradable and compostable and made of readily renewable resources such as the fibrous plant materials available from bamboo, bagasse and other plants which grow abundantly and more rapidly than trees. Such materials are processed in a manner which results in a durable, heat-resistant composition which may be readily molded into the desired shape of the cup and lid. The present invention also includes a filter assembly including one or more layers of biodegradable, compostable filter paper made from readily renewable resources coupled to a support ring. The support ring may be die-cut from a biodegradable, compostable paperboard or may be formed from a polymer such as a polylactic acid (PLA) and poly-L-lactide (PLLA). These polymers are also biodegradable and compostable. The materials used to form the paperboard, the PLA or the PLLA are also readily renewable. The support ring has a diameter adapted to permit the support ring to engage a ledge formed into the interior of the cup. The support ring is also formed with a plurality of teeth along the outer circumference which engage the wall of the cup adjacent the ledge to prevent the filter from becoming disengaged from the ledge. As such, only compostable and biodegradable materials made from readily renewable resources are employed to form the single-serve beverage ingredient package.

BRIEF DESCRIPTION OF THE DRAWINGS

The foregoing features, objects and advantages of the invention will become apparent to those skilled in the art from the following detailed description and with reference to the following drawings in which like numerals and the several views refer to corresponding parts.

DETAILED DESCRIPTION

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

Figure 1:
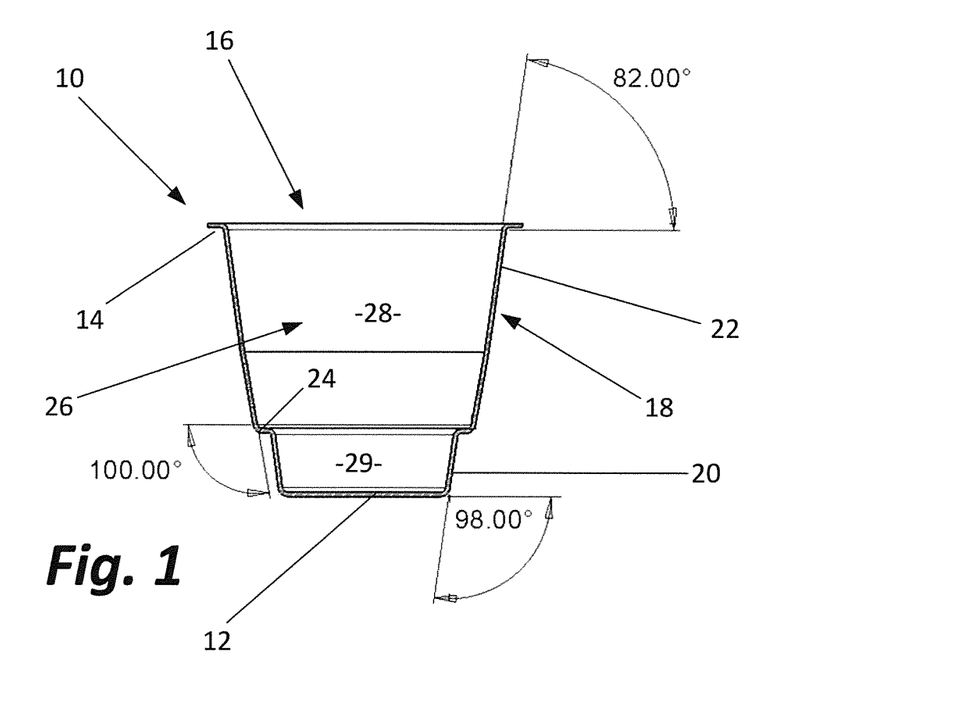
FIG. 1 is a cross-section of a cup of a single-serve beverage ingredient package.

A single-serve beverage ingredient packaging comprising a cup 10, a lid 30 and a filter 50 is illustrated in the drawings. The cup 10 includes a generally flat base 12, an upper lip 14 surrounding an open top 16 and an upstanding side wall 18 extending between the base 12 and lip 14. The side wall 18 includes a lower section 20 and upper section 22 separated by an inwardly extending shelf or ledge 24. The side wall 18 surrounds a chamber 26 having an upper first chamber section 28 between the ledge 24 and the lip 14, a lower second chamber section 29 between the ledge 24 and the base 12. The lower section 20 of the side wall 18 is shown having an angle with respect to the base of 98°. The upper section 22 extends at an angle with respect to the plane defined by the base 12 of 100°.

Figure 2:
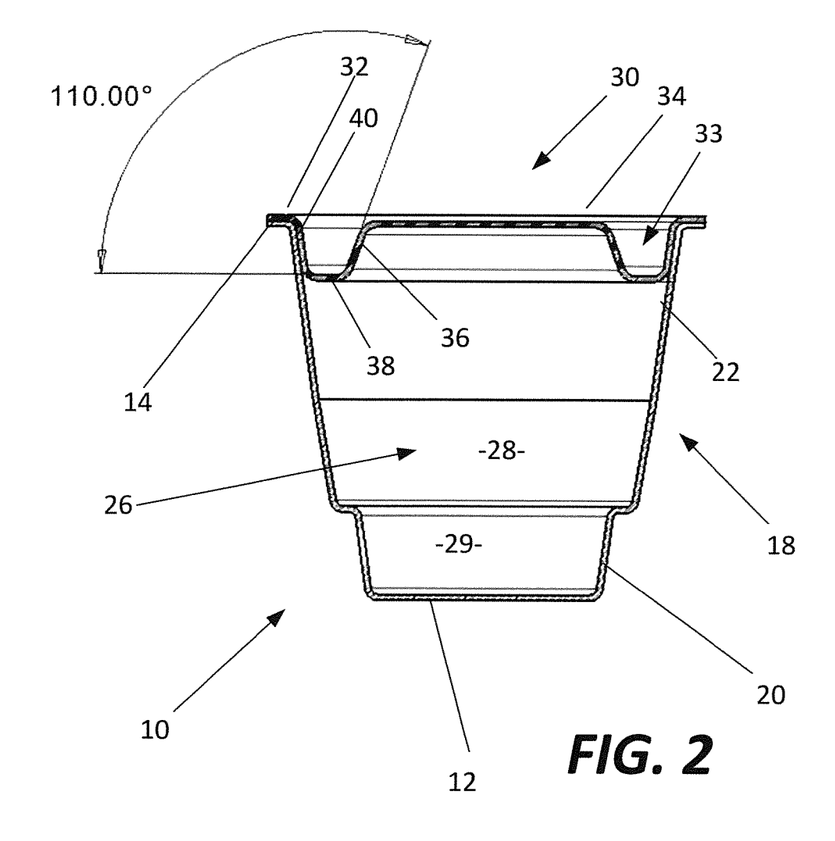
FIG. 2 is a cross-section of a cup and lid of a single-serve beverage ingredient package.

As shown in FIG. 2, a lid 30 is provided to close the open top 16 of the cup 10 to seal the chamber 26. The cover 30 has an outer lip 32 and a center section 34. Extending between the lip 32 and the center section 34 is a peripheral valley 33 defined by an inner wall 36 extending downwardly from the outer edge of the center section 34, an outer wall 40 extending downwardly from the inner edge of the outer lip 32 and a bottom wall 38 joining the bottom of the inner wall 36 and the bottom of the outer wall 40. The inner wall extends at an angle of 110° from the bottom wall 38. The outside diameter of the cover, as defined by the outer wall 40, is adapted to the diameter of the upper section 22 of wall 18 of the cup 10 such that, when the cover 30 is joined to the cup 10 as shown in FIG. 2, there is a firm frictional fit which prevents the lid 30 from being accidentally dislodged from the cup. A biodegradable, compostable adhesive made from readily renewable resources may also be employed to fasten the cover 30 to the cup 10.

Figure 3:
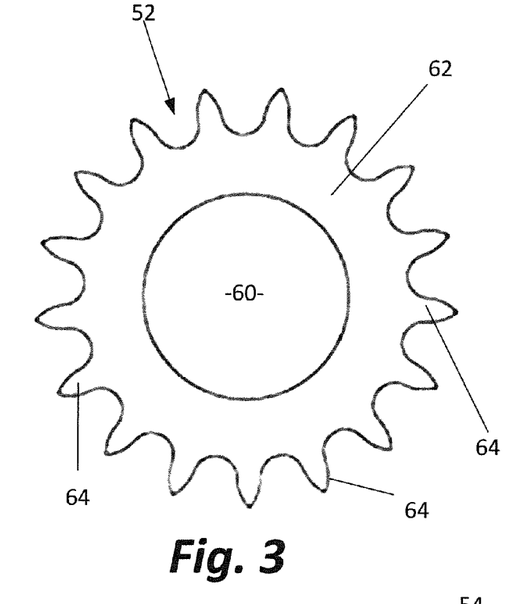
FIG. 3 is a top plan view of a filter support ring of a single-serve beverage ingredient package.
Figure 4:
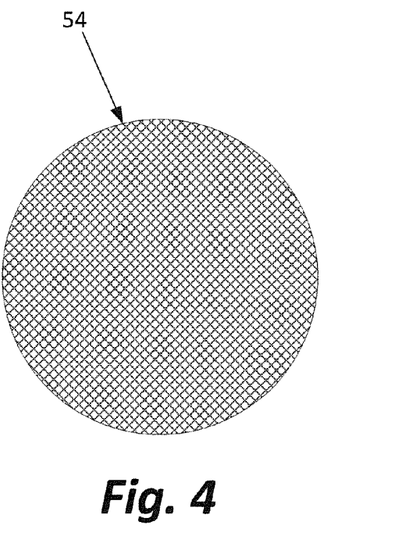
FIG. 4 is a top plan view of a piece of filter paper of a single-serve beverage ingredient package.
Figure 5:
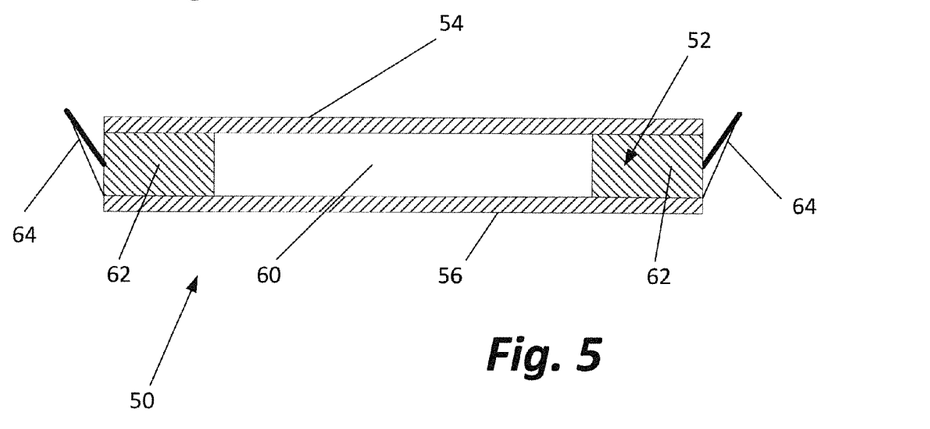
FIG. 5 is a cross-section of a filter made of the filter support ring of FIG. 3 sandwiched between two pieces of filter paper of the type shown in FIG. 5.
Figure 6:
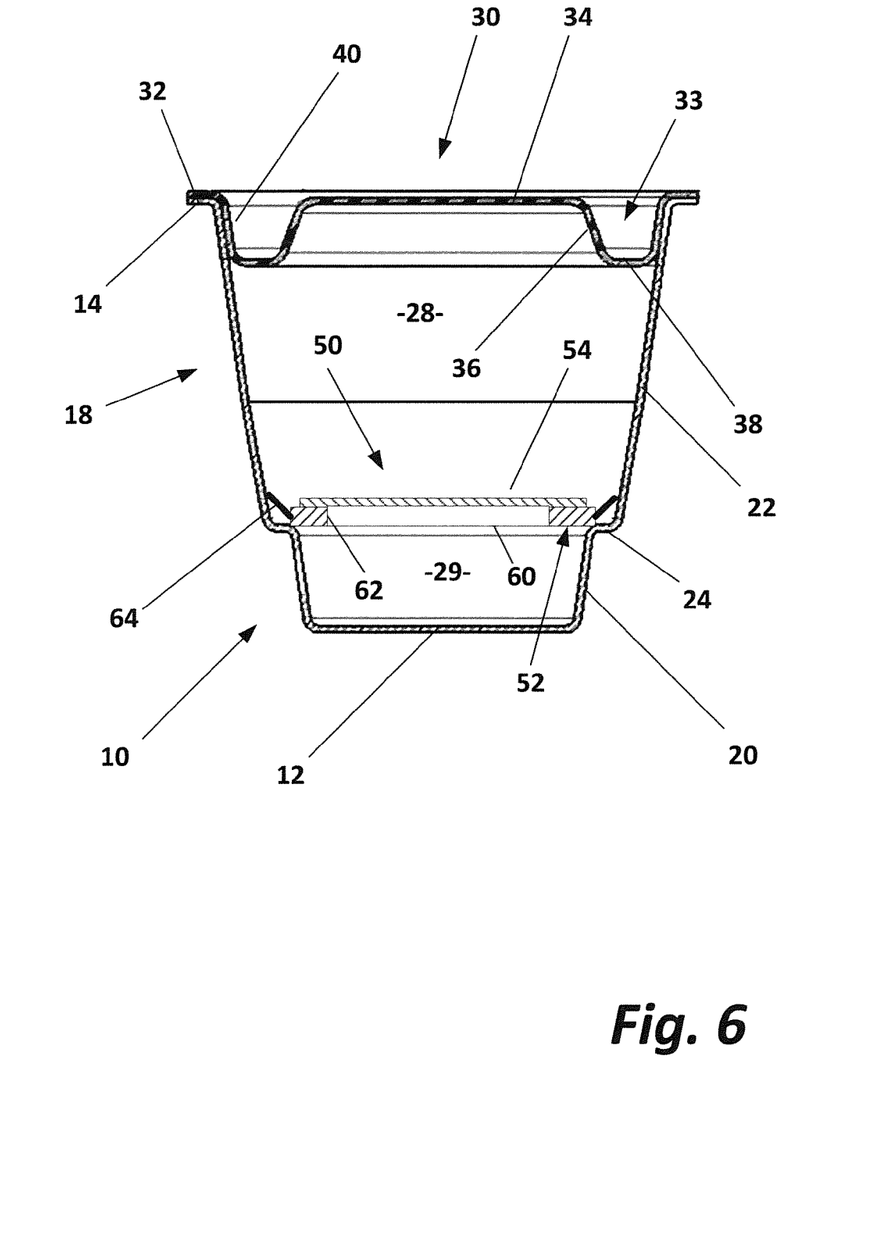
FIG. 6 is a cross-section showing a cup, filter and lid of a single-serve beverage ingredient package in assembled relation.

As shown in FIGS. 3-6, a filter assembly 50 is provided. The filter assembly 50 includes a support ring 52 best shown in FIG. 3 and at least one filter paper layer, one of which is shown in FIG. 4. As shown in FIG. 5, the support ring 52 may also be sandwiched between an upper filtration layer 54 and a lower filtration layer 56. Alternatively, only a single filtration layer 54 may be employed as shown in FIG. 6.

The support ring, as shown in FIG. 3, has an open center section 60, an intermediate section 62 and an outer section comprising at least one member adapted to engage the side wall 18 of the cup 10 and, preferably, a plurality of peripheral teeth 64. The filtration layers 54 and 56 completely cover the open center section 60 and at least a portion of the intermediate section 62.

The support ring may be made of polylactic acid (PLA), a thermoplastic aliphatic polyester derived from a readily renewable resource such as corn starch or sugar cane. Whichever specific polymer (or form thereof) is used, the polymer should have a melting temperature above the brewing temperature to be employed. Since most beverages are brewed at or below 100° C., the boiling point of water, the melting point of the polymer should be higher than 100° C.

As such, poly-L-lactide (PLLA) may be employed since this form of the polymer has a crystallinity of around 37% and a melting temperature of about 175° C. which is well above the temperature at which coffee, tea, cocoa or the like are typically brewed. PLA and PLLA not only are produced from renewable resources, but is also environmentally friendly because these materials are readily recycled and are also both biodegradable and compostable.

Other materials meeting the temperature and composting requirements set forth above which are made from renewable resources may be employed for the filter support ring without deviating from the invention.

As should be clear from the foregoing, the use of biodegradable, compostable materials made from readily renewable resources is a key advantage of the present invention. As used herein, the term "biodegradable" means a substance or object capable of being decomposed by bacteria or other living organisms. The term "compostable" means a substance that (1) breaks down at essentially the same rate as paper; (2) disintegrates in the compost; and (3) does not produce any toxic material such that the compost can support plant growth. A resource is "readily renewable" if it is derived from plant materials which grow abundantly or more rapidly than trees. Examples of such plant materials include bamboo or bagasse. A resource which is recycled, such as paper made from whatever source, is also deemed to be "readily renewable" because it is abundantly available and its use will not directly result in the exhaustion of non-renewable resources such as oil or the harvesting of trees.

Assembly of the cup 10, filter 50 and lid 30 to form a single-serve beverage ingredient package is relatively straightforward and simple. First, the filter 50 is placed over the cup and lowered until the outer circumference of the intermediate section 62 of the ring 52 engages (e.g. comes to rest upon) the ledge 24 of the cup 10 as shown in FIG. 6. As the filter is so lowered into the cup, the teeth 64 will be deflected upwardly by the wall 18 of the cup 10. With the filter 50 seated on or engaging the ledge 24, the teeth 64 press against the upper section 22 of the wall 18 of the cup 10 to secure the filter 50 in place and prevent the filter 50 from lifting off or disengaging from the ledge 24.

Next, coffee, tea or cocoa or some other dry ingredient to be brewed is placed in the cup 10 and over the filter 50 such that the dry ingredient is located in the first chamber section 28. The filter 50 prevents the dry ingredient from reaching the lower second chamber section 29 of cup 10. The term "ingredient" is used broadly so as to encompass either a single dry ingredient or a blend or mixture of dry ingredients. Finally, the lid 30 is secured in place as illustrated in FIG. 6.

When the package described above is used in a brewer such as those sold by Keurig®, the cover 30 is pierced with an injector and the base 12 is pierced with an extractor. A fluid brewing medium such as water or the like is injected through the injector into the upper first chamber section 28 of cup 10 where it mixes with and/or dissolves the dry beverage ingredient previously placed in the cup 10. The mixture or solution then passes through the upper filtration layer 54, through the center open section 60 of the filter support ring 52 and through the lower filtration layer 56 (if a lower filtration layer has been provided) into the lower second chamber section 29 of the chamber 26. The undissolved, unmixed residue of the dry ingredient is retained in the upper first chamber section 28 of chamber 26 by the filter 50. The mixture or solution exits the lower section portion 29 of the chamber through the base 12 via the extractor and into a coffee mug or the like so that the beverage may be consumed.

To achieve a container made entirely of materials comprising renewable resources and which are biodegradable and compostable, the cup 10, and lid 30 and filtration layers 52 and 56 are all made from paper-like substances formed from fibrous plant materials which grow swiftly such as grasses like wheat, bamboo and sugar cane. The resources are swiftly replenishable because they grow quickly and are abundant. Alternatively, such resources may be recycled paper or other recycled materials which are biodegradable and compostable. As noted above, the filter support ring is also made of materials formed from readily renewable resources which are likewise both biodegradable and compostable, e.g., PLA or PLLA. Such materials may also be employed in the construction of the cup 10 and lid 30.

Many recycled paper products include trace levels of bisphenol A (BPA) or other chemicals used in the inks or coatings on the paper which is recycled. Thus, when recycled paper is used as a source material, care should be taken to encapsulate or remove such chemicals so unsafe levels are not consumed. Removal may add to cost and encapsulation may add to cost or inhibit biodegradability and compostability. These types of problems can be avoided by using virgin paper products made from plants having a short growing cycle which do not contain such harmful chemicals.

Use of the aforementioned materials and similar materials also permit brewing to occur within the package itself. The lid 30 is adapted to be penetrated by a fluid injector. The base 12 is adapted to be penetrated by a fluid extractor. As such, hot water or some other fluid is passed through the lid 30 via the injector where it mixes with or dissolves a granular material such as coffee, tea or cocoa in the upper first section 28 of the chamber 26. The mixture or solution then passes through the filter 50 into the lower second section 29 of the chamber 26 while leaving any residue behind in the first section 28 of chamber 26. The brewed beverage then exits the container through an extractor which has penetrated the base 12.

Various modifications may be made without deviating from the invention. Such modifications may concern the shapes and sizes of the various components and the materials from which the components are made. By way of example, the cup and lid may be made of a non-porous molded paper-like substance or may be made of the same materials as the filter support ring, e.g., PLA or PLLA. Further, the filter may be integrally formed of a material such as PLA or PLLA without a center opening or separate filtration layers by providing perforations large enough to permit the brewed mixture or solution of coffee, tea or the like to pass through the filter and at the same time small enough to prohibit any substantial quantity of the dry material or residue from passing through the filter.

Figure 7:
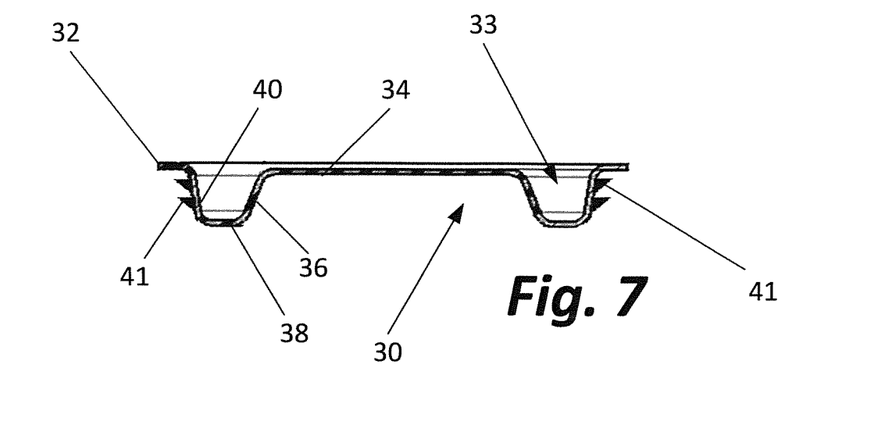
FIG. 7 is a cross-section of an alternative embodiment of the lid.
Figure 8:
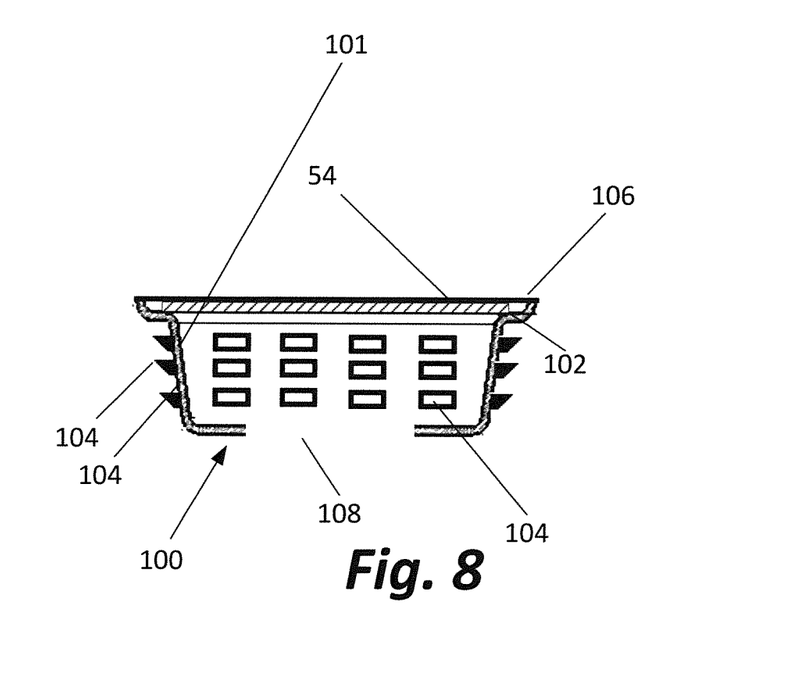
FIG. 8 is an exploded cross-section of a filter and filter support assembly.
Figure 9:
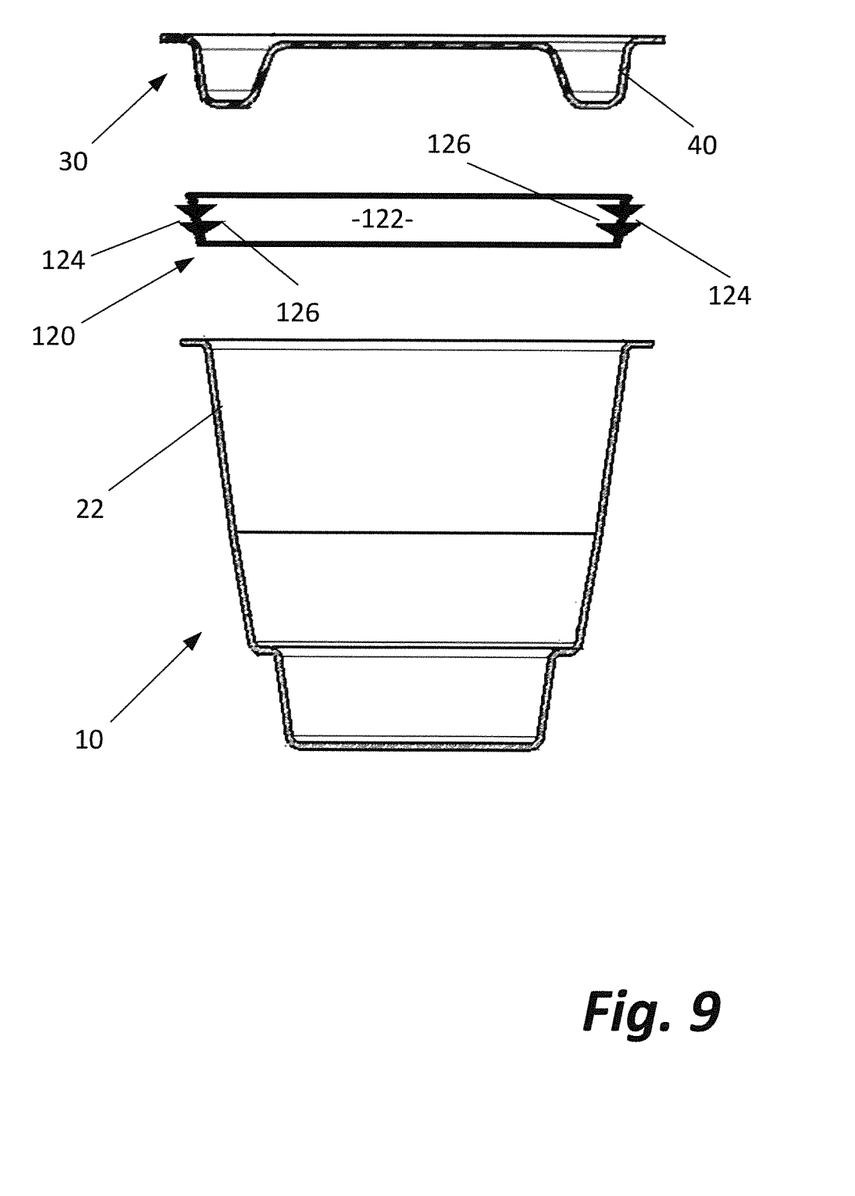
FIG. 9 is an exploded cross-section of a lid, cup and locking ring employed to join the cup and lid together.

Other examples of modifications are shown in FIGS. 7-9. FIG. 7 shows a lid 30 having an outer lip 32, center section 34 and peripheral valley 33 defined by an inner wall 36 and outer wall 40 and a bottom wall 38 like the lid 30 shown in FIG. 6. However, extending outwardly from the outer wall 40 are a plurality of teeth 41 which flex and engage the upper section 22 of the wall 18 of cup 10 when the cover 30 is coupled to the cup 10. Through such engagement, the teeth 41 inhibit separation of the lid 30 from the cup 10. Such teeth 41 are easily formed into the lid 30 if the lid is molded from a material such as PLLA.

FIG. 8 shows an alternative embodiment for securing the filter 50 in place inside the cup 10. As shown in FIG. 8, the filter support ring 52 is replaced with a filter support structure 100. The filter support structure has an open bottom 108 and a wall 101 which is in face-to-face engagement with the inside surface of the lower section 20 of the side wall 18 of the cup 10. Filter support structure 100 also includes a ledge 102 which is adapted to engage the shelf or ledge 24 of the cup 10. The top 106 of the ledge 102 provides a support for the peripheral edge of a filtration layer 54. The filtration layer 54 may be bonded to the structure 100 during molding of the support structure 100 such as when the support structure 100 is made of PLLA. Alternatively, the filtration layer may be bonded to the support structure using a biodegradable and compostable adhesive. Extending outwardly from the wall 101 are a plurality of teeth 104 which engage the inner surface of the lower section 20 of the side wall 18 of cup 10 to firmly fix the support structure 100 in place within the lower chamber 29 of cup 10.

FIG. 9 shows still another alternative arrangement for securing the lid 30 to the cup 10. As shown in FIG. 9, a ring 120 is provided. Ring 120 has a wall 122. Teeth 124 project outwardly from wall 122. Teeth 126 project inwardly from wall 122. During assembly, the ring 120 is fitted around the outer wall 40 of the lid 30. The teeth 126 engage the outer wall 40 of the lid 30 to couple the ring 120 to the lid 30. Next, the assembled lid 30 and ring 120 are inserted into the top of the cup 10. This causes the outer teeth 124 to engage the inner surface of the upper section 22 of the wall of the cup 10 to inhibit separation of the ring 120 and lid 30 from the cup. The ring 120 may be made of PLA or PLLA while the lid 30 and cup 10 are formed of readily renewable, biodegradable and compostable materials made from bamboo, wheat grass, bagasse or the like.

The foregoing description is intended to explain the various features and advantages, but is not intended to be limiting. The scope of the invention is defined by the following claims which are also intended to cover a reasonable range of equivalents.

What is claimed is:

1. A single-serve beverage ingredient package comprising:
   (a) a cup having a base, an open top surrounded by an upper lip, a continuous side wall extending between the base and the lip, the side wall including a lower section and an upper section separated by a ledge, and a chamber having a first section between the base and the ledge and a second section between the ledge and the lip, wherein the cup is integrally formed from a biodegradable, compostable material made from readily renewable resources;
   (b) a lid for closing the open top of the container, wherein the lid is integrally formed from a biodegradable, compostable material made from readily renewable resources;
   (c) a biodegradable, compostable filter adapted to engage and be supported adjacent the ledge of the cup made from at least one readily renewable resource, said filter comprising a first filtration layer coupled to a filter support ring, the filter support ring comprising an intermediate section, a center open section surrounded by the intermediate section and adapted to engage the ledge of the cup, and a plurality of teeth extending outwardly from the intermediate section of the support ring and adapted to engage the side wall of the cup to inhibit disengagement of the intermediate section from the ledge.

2. The single-serve beverage ingredient package of claim 1 wherein the support ring is made from a polylactic acid.

3. The single-serve beverage ingredient package of claim 1 wherein the support ring is made from a poly-L-lactide.

4. The single-serve beverage ingredient package of claim 1 wherein the support ring is made from a polymer that melts at a temperature of above 100° C.

5. The single-serve beverage ingredient package of claim 1 wherein at least the center open section of the support ring and a portion of the intermediate section are sandwiched between the first filtration layer and a second filtration layer.

6. The single-serve beverage ingredient package of claim 1 wherein said filter is adapted to prevent a dry ingredient and residue from passing from the first section to the second section of the chamber while permitting a liquid mixture or solution to pass from the first section to the second section.

7. The single-serve beverage ingredient package of claim 6 wherein said dry ingredient material is selected from a group consisting of coffee, tea and cocoa.

8. The single-serve beverage ingredient package of claim 1 wherein said lid is adapted to be penetrated by a fluid injector and said base is adapted to be penetrated by a fluid extractor.

9. The single-serve beverage ingredient package of claim 1 wherein the lid has a plurality of teeth adapted to engage the upper section of the side wall of the cup.

10. The single-serve beverage ingredient package of claim 1 wherein the filter includes a filter support structure having an open bottom, a wall having a plurality of teeth extending outwardly therefrom, said teeth engage the lower section of the side wall of the cup.

11. The single-serve beverage ingredient package of claim 1 having a filtration layer bonded to the filter support structure.

\* \* \* \* \*